US012792355B2

(12) United States Patent
Ravichandrasekaran et al.

(10) Patent No.: US 12,792,355 B2
(45) Date of Patent: Nov. 10, 2026

(54) ADAPTIVE TRIGGERED OPERATION MANAGEMENT IN A NETWORK INTERFACE CONTROLLER

(71) Applicant: Hewlett Packard Enterprise Development LP, Spring, TX (US)

(72) Inventors: Naveen Namashivayam Ravichandrasekaran, Saint Paul, MN (US); Krishna Chaitanya Kandalla, Saint Paul, MN (US); James Buford White, III, Solana, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 407 days.

(21) Appl. No.: 18/524,749

(22) Filed: Nov. 30, 2023

(65) Prior Publication Data

US 2025/0181353 A1 Jun. 5, 2025

(51) Int. Cl.
*G06F 9/30* (2018.01)
*G06F 9/38* (2018.01)

(52) U.S. Cl.
CPC ........ *G06F 9/30192* (2013.01); *G06F 9/3856* (2023.08)

(58) Field of Classification Search
CPC .... G06F 9/30192; G06F 9/3856; G06F 9/546; H04L 47/10
USPC .......................................................... 718/102
See application file for complete search history.

(56) References Cited

U.S. PATENT DOCUMENTS 9,571,408 B2 * 2/2017 Aingaran ................ H04L 47/30
2004/0034718 A1 * 2/2004 Goldenberg ............ H04L 69/12 709/250
2018/0189104 A1 * 7/2018 Agarwal ................. G06F 9/455
2019/0042337 A1 * 2/2019 Dinan ...................... G06F 9/546
2022/0197845 A1 * 6/2022 Roweth ............... G06F 13/1642
2022/0217079 A1 * 7/2022 Beecroft ............. G06F 13/1642

OTHER PUBLICATIONS

"An Architecture to Perform NIC Based MPI Matching", SAND2007-0896C, 2007, 22 pages.

(Continued)

*Primary Examiner* — Jacob D Dascomb
(74) *Attorney, Agent, or Firm* — Yao Legal Services, Inc.

(57) ABSTRACT

A system for managing triggered operations in a computing system is provided. The computing system can include a storage medium to store descriptors identifying triggered operations to be performed based on respective trigger conditions. A network interface controller of the computing system can store a data structure. During operation, the system can determine, for a process, a window size indicating a number of available entries in the data structure. If the window size indicates an available entry, the system can insert a descriptor of a triggered operation generated by the process into a corresponding work queue. The system, at the NIC, can determine a location of the descriptor in the work queue. The system can then transfer the descriptor from the location to the data structure. Subsequently, the system can decrement the window size indicating an updated number of available entries for the first process in the data structure.

20 Claims, 10 Drawing Sheets

(56) References Cited

OTHER PUBLICATIONS

"Nekbone", available online at <https://asc.llnl.gov/sites/asc/files/2020-06/Nekbone_Summary_v2.3.4.1.pdf>, 2020, 5 pages.
"The Quadrics Network: High-Performance Clustering Technology", IEEE, 2002, 12 Pages.
Advanced Simulation and Computing, "CORAL-2 Benchmarks", available online at <https://web.archive.org/web/20221209115210/https://asc.llnl.gov/coral-2-benchmarks>, Dec. 9, 2022, 13 pages.
Awan et al., "Characterizing CUDA Unified Memory (UM)-Aware MPI Designs on Modern GPU Architectures", 2019, 35 pages.
Barrett et al., "Using Triggered Operations to Offload Rendezvous Messages", 2011, 8 pages.
Beecroft et al., "QsNetll: An Interconnect for Supercomputing Applications", . 2003, 9 pages.
Dahm et al., "Sierra Center of Excellence: Lessons Learned", IEEE, 2019, 15 Pages.
Daoud et al., "GPUrdma: GPU-side library for high performance networking from GPU kernels", ACM 2016, 8 pages.
Dosanjh et al., "Implementation and Evaluation of MPI 4.0 Partitioned Communication Libraries", Elsevier, 2021, 11 pages.
Ferreira et al., "Hardware MPI Message Matching: Insights into MPI Matching Behavior to Inform Design", 2017, 21 pages.
GITHUB, "GPUDirect Async support for IB Verbs", available online at <https://web.archive.org/web/20210308171818/https://github.com/gpudirect/libgdsync>, Mar. 8, 2021, 5 pages.
GITHUB, "ROCr-Runtime HSA Runtime API and runtime for ROCm", available online at <https://web.archive.org/web/20210720033844/https://rocmdocs.amd.com/en/latest/Installation_Guide/ROCR-Runtime.html>, Jul. 20, 2021, 4 pages.
Grant et al., "Finepoints: Partitioned Multithreaded MPI Communication", 2019, 19 pages.
Greenberg et al., "A System Software Architecture for High-End Computing", ACM, 1997, 15 pages.
Grun et al., "A Brief Introduction to the OpenFabrics Interfaces A New Network API for Maximizing High Performance Application Efficiency", 2015, 6 pages.
Hamidouche et al., "GPU Initiated OpenSHMEM: Correct and Eicient Intra-Kernel Networking for dGPUs", ACM, 2020, 12 pages.
Hatanaka et al., "Optimization of MPI Persistent Communication", 2013, 7 pages.
Hemmert et al., "Using Triggered Operations to Offload Collective Communication Operations", 2010, 8 pages.
Hoefler et al., "Remote Memory Access Programming in MPI-3", 2015, 26 pages.
NVIDIA GPUDirect, "Enhancing Data Movement and Access for GPUs", available online at <https://web.archive.org/web/20210224040154/https://developer.nvidia.com/gpudirect>, Feb. 24, 2021, 5 pages.
OpenFabrics, "Libfabric Programmer's Manual", available online at <https://ofiwg.github.io/libfabric/v1.9.1/man/fi_trigger.3.html>, 2023, 4 pages.
OPENSHEM,"Application Programming Interface", Version 1.4, Dec. 2017, 134 pages.
Petrini et al., "Hardware- and Software-Based Collective Communication on the Quadrics Network", 2001, 12 pages.
Potluri et al., "Optimizing MPI Communication on Multi-GPU Systems using CUDA Inter-Process Communication", 2012, 22 pages.
Schonbein et al., "Measuring Multithreaded Message Matching Misery", 2018, 13 pages.
Steve Rennich, "Cuda C/C++ Streams and Concurrency", 2011, 27 pages.
Taylor et al., "Not all applications have boring communication patterns: Profiling message matching with BMM", 2023, 10 pages.
Walker et al., "MPI A Standard Message Passing Interface", Nov. 1995, 15 pages.
Wang et al., "MVAPICH2)GPU:—Op0mized-GPU-to-GPUCommunica0on-for-InfiniBand-Clusters", 2011, 27 pages.
Zhou et al., "MPIX Stream: An Explicit Solution to Hybrid MPI+X Programming", 2022, 10 pages.

* cited by examiner

ADAPTIVE TRIGGERED OPERATION MANAGEMENT IN A NETWORK INTERFACE CONTROLLER

STATEMENT OF GOVERNMENT-FUNDED RESEARCH

This invention was made with Government support under Prime Contract No. DE-AC52-07NA27344 awarded by the Department of Energy (DoE). The Government has certain rights in the invention.

BACKGROUND

Field

High-performance computing (HPC) can often facilitate efficient computation on the nodes running an application. HPC can facilitate high-speed data transfer between sender and receiver devices.

BRIEF DESCRIPTION OF THE FIGURES

In the figures, like reference numerals refer to the same figure elements.

DETAILED DESCRIPTION

Figure 1:
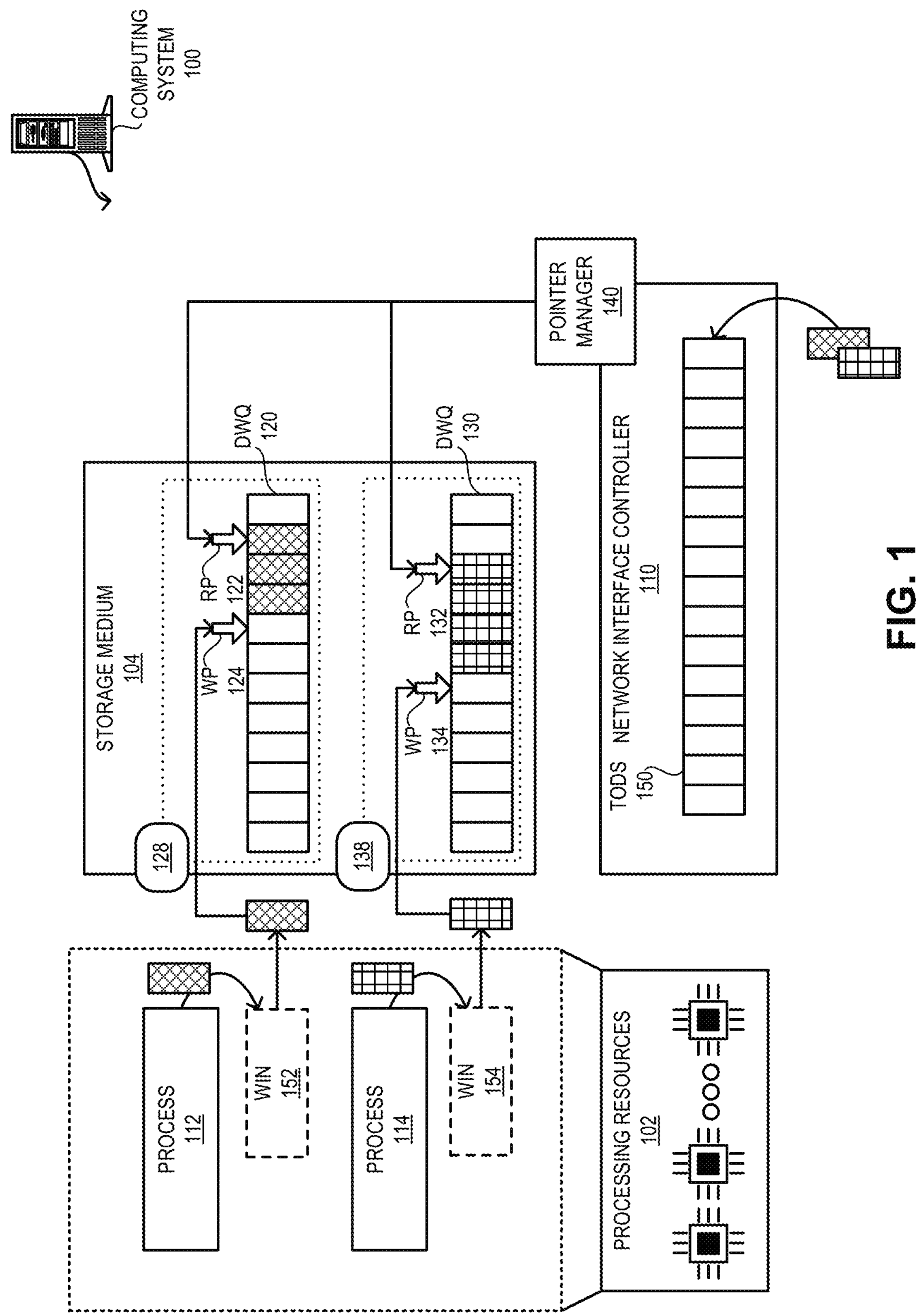
FIG. 1 illustrates an example of adaptive triggered operation management in a network interface controller (NIC), in accordance with an aspect of the present application.

As applications become progressively more distributed, HPC can facilitate efficient computation on the nodes running an application. An HPC environment can include compute nodes (e.g., computing systems), storage nodes, and high-capacity network devices coupling the nodes. Hence, the HPC environment can include a high-bandwidth and low-latency network formed by the network devices. The compute nodes can be coupled to the storage nodes via a network. The compute nodes may run one or more application processes (or processes) in parallel. The storage nodes can record the output of computations performed on the compute nodes. In addition, data from one compute node can be used by another compute node for computations. Therefore, the compute and storage nodes can operate in conjunction with each other to facilitate high-performance computing.

One or more processes can perform computations on the processing resources, such as processors and accelerators, of a compute node. The data generated by the computations can be transferred to another node using a NIC of the compute node. Such transfers may include a remote direct memory access (RDMA) operation. To transfer the data, the process can enqueue a descriptor in a command queue in the memory of the compute node and set a register value. Based on the register value, the NIC can determine the presence of the descriptor and dequeue the descriptor from the command queue.

The NIC can then retrieve information associated with the RDMA operation, such as information on the source buffer (e.g., the location of the data to be transferred), a target buffer (e.g., the location where the data is to be transferred), the size of the data transfer, memory registration, and target process details, from the descriptor. The data can be generated by the execution of the process and stored in the source buffer (e.g., in the storage medium of the computing system). Therefore, the descriptor can be an identifier of the identifier of the operation. Typically, after dequeuing the descriptor, the NIC can perform the data transfer operation (e.g., transfer a packet).

In addition, the NIC can also support triggered operations that can allow the process to enqueue operations with deferred execution. For example, the process may deploy parallel looped computations performed in a nested and repeating way. Such computations are often performed on different compute nodes and may rely on the output of each other's computations. These computations are often offloaded to accompanying hardware elements, such as the accelerators, for execution. The corresponding communication operation can be deferred for a later execution when the computation is complete. Hence, the corresponding communication operation can be expressed as the triggered operation. When a trigger condition is satisfied, the NIC can execute the triggered operation.

The NIC may store the descriptor of the triggered operation and the corresponding trigger condition in a triggered operation data structure (TODS). A descriptor of a triggered operation can be referred to as a triggered descriptor. When the execution of the computation is complete, a trigger event can be executed. The execution of the trigger event can then satisfy the trigger condition. For example, the trigger condition can be a counter value reaching a threshold value, and the trigger event can be incrementing the counter value. When the trigger condition is satisfied, the NIC can obtain the triggered operation based on the information in the triggered descriptor stored in the TODS. The NIC can then execute the triggered operation, which may include sending a packet comprising the output of the computation.

The aspects described herein address the problem of efficiently distributing the entries of the TODS among the processes in a non-blocking way by (i) distributing the entries of the TODS among the processes generating triggered operations; (ii) maintaining a window that indicates the available entries a process; and (iii) decrementing and incrementing the window size (WIN) in response to enqueuing and executing a triggered operation, respectively. Here, the size of the window can be referred to as the window size. The window size associated with a process can indicate the number of entries of the TODS allocated to the process. Because the window size can indicate the currently available entries for the process, the process can enqueue the descriptor of a triggered operation into the TODS when the window size has a non-zero value. In this way, the TODS can support triggered operations from a plurality of processes without overwhelming the TODS.

Unlike the regular operations executed on the NIC, triggered operations offer deferred execution where the execution of the triggered operations can be triggered at a later time. The process generating a triggered operation can incorporate information associated with the triggered operation in a triggered descriptor and enqueue it in a deferred work queue (DWQ). The process can also set a register value to indicate the presence of the descriptor in the DWQ. In addition to a regular descriptor, the triggered descriptor can incorporate three additional parameters—a trigger counter, a completion counter, and a trigger threshold value. The trigger threshold value can be a predetermined value. Because the triggered descriptor includes identifying information associated with a triggered operation, the triggered descriptor can also be referred to as an identifier of the triggered operation. If the trigger counter is incremented to reach the threshold value, the NIC can determine the location of the triggered operation based on the triggered descriptor and execute the triggered operation. Because a triggered operation can often repeat (e.g., in a loop), the completion counter can indicate the number of times the triggered operation is executed.

A TODS can be deployed in the NIC to support the triggered operations. The TODS can be a hardware entity, such as a storage medium. The NIC can enqueue a descriptor from the DWQ in an available entry of the TODS. A descriptor of a triggered operation can be referred to as a triggered descriptor. When the triggered operation is executed, the entry can be released for reuse. The number of entries in the TODS can be limited due to the limited hardware resources of the NIC. If the computing system hosting the NIC executes a plurality of processes, the TODS can be shared among the processes. With limited availability of the hardware resource in the NIC and the TODS being shared among multiple processes, some processes may oversubscribe the TODS, while some other processes may not utilize the TODS due to resource exhaustion. Consequently, the functionality and performance of the underutilized processes can be adversely affected.

To address this issue, the NIC can allocate the available entries of the TODS to individual processes generating triggered operations and transfer a triggered descriptor issued by a process if the process has a corresponding available entry. Here, the NIC may distribute the entries of the TODS uniformly where the NIC can allocate an equal number of entries of the TODS to a respective process. The entries can also be distributed non-uniformly (e.g., based on the respective workloads of the processes). A respective process can maintain a window to indicate the number of available entries in the TODS allocated to the process. When a new triggered operation is generated, the process can check the window size associated with the process to determine whether an entry in TODS is available for the process. If an entry is available, the process can enqueue the corresponding triggered descriptor into a DWQ. The NIC can then determine the presence of the triggered descriptor based on a register value. For example, the process can set a predetermined value to a register to notify the NIC that a triggered descriptor has been enqueued.

The NIC can obtain the triggered descriptor from the DWQ based on a read pointer (RP). The read pointer can point to a memory location of the computing system that stores the DWQ. The read pointer can be controlled by the NIC. On the other hand, the write pointer (WP) of the DWQ can be controlled by the corresponding process. Based on the read pointer, the NIC can determine the location of the triggered descriptor and transfer the triggered descriptor to the TODS. Transferring the triggered descriptor can include reading from the location indicated by the read pointer, enqueueing the triggered descriptor into the segment, and updating the read pointer to indicate a subsequent location in the DWQ.

When the trigger condition indicated in the triggered descriptor is satisfied, the NIC can retrieve the triggered operation from the source buffer, which can be specified by the triggered descriptor, and perform the operation. Upon execution of the triggered operation, the process can increment the window size and allow another triggered descriptor to be enqueued. If the window is depleted (i.e., the window size becomes zero) for a process, the process is precluded from inserting or enqueuing a subsequent triggered descriptor into the DWQ. When the window size is incremented to a non-zero value, the process can insert the next triggered descriptor into the DWQ. In this way, the processes are prevented from overwhelming the TODS, and the rate of generating triggered operations of one process may not impact another independent process. Furthermore, because a respective process can use a subset of entries of the TODS allocated to the process, the TODS can support lockless sharing, where the TODS can be shared among the processes without a lock.

FIG. 1 illustrates an example of adaptive triggered operation management in a NIC, in accordance with an aspect of the present application. A computing system 100, which can be an HPC compute node, can include a plurality of processing resources 102, a storage medium 104 (e.g., a memory device or a non-volatile persistent storage), and a NIC 110. A number of processes, such as processes 112 and 114, can perform computations on processing resources 102. Examples of a processing resource can include, but are not limited to, a processor (e.g., a central processing unit (CPU), a CPU core, and an accelerator, such as a graphical processing unit (GPU) or a tensor processing unit (TPU). The data generated by the computations performed by processes 112 and 114 can be used by corresponding processes on other compute nodes. For example, if the computation performed by process 112 includes a distributed summation operation, the output or result of the computation can be sent to a compute node aggregating the summations.

NIC 110 can then send the data to the other compute node using remote access, such as RDMA. Because process 112 may know that an RDMA operation is to be performed by NIC 110 after the computation is complete, process 112 can determine that sending the data can be a triggered operation that can be deferred for execution at a later time. Hence, to send the data, process 112 can enqueue a triggered descriptor associated with RDMA in a DWQ 120 at a location indicated by a write pointer 124 and set a predetermined value to register 128. DWQ 120 can be stored in storage medium 104. Based on the value in register 128, NIC 110 can determine the presence of the descriptor and dequeue the descriptor from DWQ 120 from a location indicated by a read pointer 122. The triggered descriptor can include information associated with the RDMA operation, such as information on the source buffer, a target buffer, the size of the data transfer, memory registration, target process details, a trigger counter, a completion counter, and a trigger threshold value.

Similarly, to send the data, process 114 can enqueue a triggered descriptor associated with RDMA in a DWQ 130 at a location indicated by a write pointer 134 and set a predetermined value to register 138. DWQ 130 can also be stored in storage medium 104. Based on the value in register 138, NIC 110 can determine the presence of the descriptor and dequeue the descriptor from DWQ 130 from a location indicated by a read pointer 132. Here, read pointers 122 and 132 can be controlled by a pointer manager 140 of NIC 110. Upon obtaining respective triggered descriptors from DWQs 120 and 130, pointer manager 140 can update read pointers 122 and 132, respectively, to point to the next entry. Pointer manager 140 can operate based on the Heterogeneous System Architecture (HSA) specification to communicate with other elements, such as processing resources 102 and storage medium 104. Hence, pointer manager 140 can use HSA to access DWQs 120 and 130, and update read pointers 122 and 132.

Typically, after dequeuing a regular descriptor, NIC 110 can perform the corresponding data transfer operation without waiting for an event. In contrast, the triggered operations associated with the triggered descriptors in DWQs 120 and 130 can be deferred for execution at a later time. To facilitate the deferred execution, NIC 110 may store the triggered descriptors and the corresponding trigger conditions obtained from DWQs 120 and 130 in a TODS 150. When the trigger condition is satisfied, NIC 110 can obtain the triggered operation based on the corresponding triggered descriptor stored in TODS 150. NIC 110 can then execute the triggered operation, which may include sending a packet.

TODS 150 can be deployed in NIC 110 to support the triggered operations. TODS 150 can be a hardware entity, such as a storage medium. NIC 110 can enqueue a triggered descriptor from DWQs 120 and 130 in available entries of TODS 150. When a triggered operation is executed, the entry of TODS 150 can be released for reuse. The number of entries in TODS 150 can be limited due to the limitation of hardware resources of NIC 110. Since computing system 100 executes a plurality of processes 112 and 114, TODS 150 can be shared among processes 112 and 114. With the limited availability of the hardware resource in NIC 110 and TODS 150 being shared among processes 112 and 14, a process may oversubscribe TODS 150, while some other processes may not utilize TODS 150 due to resource exhaustion. Consequently, the performance of the underutilized processes of computing system 100 can be adversely affected.

To address this issue, the entries of TODS 150 can be allocated to processes 112 and 114 (e.g., during the library initiation). The entries of TODS 150 can be distributed uniformly or non-uniformly among processes 112 and 114. For example, if there are sixteen entries in TODS 150, each of processes 112 and 114 can enqueue up to eight entries into TODS 150 based on uniform distribution. On the other hand, if the workload of process 114 is expected to be higher than that of process 112, more entries can be allocated to process 114. Processes 112 and 114 can then determine window sizes 152 and 154, respectively. A window size associated with a process can indicate the number of entries the process is allowed to enqueue into TODS 150. When process 112 generates a new triggered operation, process 112 can check window size 152 to determine whether an entry in TODS 150 is available for process 112. If an entry is available, process 112 can enqueue the corresponding triggered descriptor into DWQ 120 and set a predetermined value in register 128. NIC 110 can then determine the presence of the triggered descriptor based on the predetermined value in register 128.

Subsequently, NIC 110 can read from the location indicated by read pointer 122 and enqueues the triggered descriptor into TODS 150. When the trigger condition indicated in the triggered descriptor is satisfied, NIC 110 can retrieve the triggered operation from the source buffer, which can be specified by the triggered descriptor, and perform the operation. Upon completing the execution of the triggered operation, process 112 can increment window size 152 and allow another triggered descriptor to be enqueued into DWQ 120. If window size 152 is depleted, process 112 is precluded from inserting a subsequent triggered descriptor into DWQ 120. When window size 152 is incremented to a non-zero value, process 112 can insert the next triggered descriptor into DWQ 120. In this way, processes 112 and 114 are prevented from overwhelming TODS 150. Furthermore, because the transferring of triggered descriptors to TODS 150 is controlled by window sizes 152 and 154, TODS 150 can support lockless sharing where TODS 150 can be shared among processes 112 and 114 without a lock.

Figure 2:
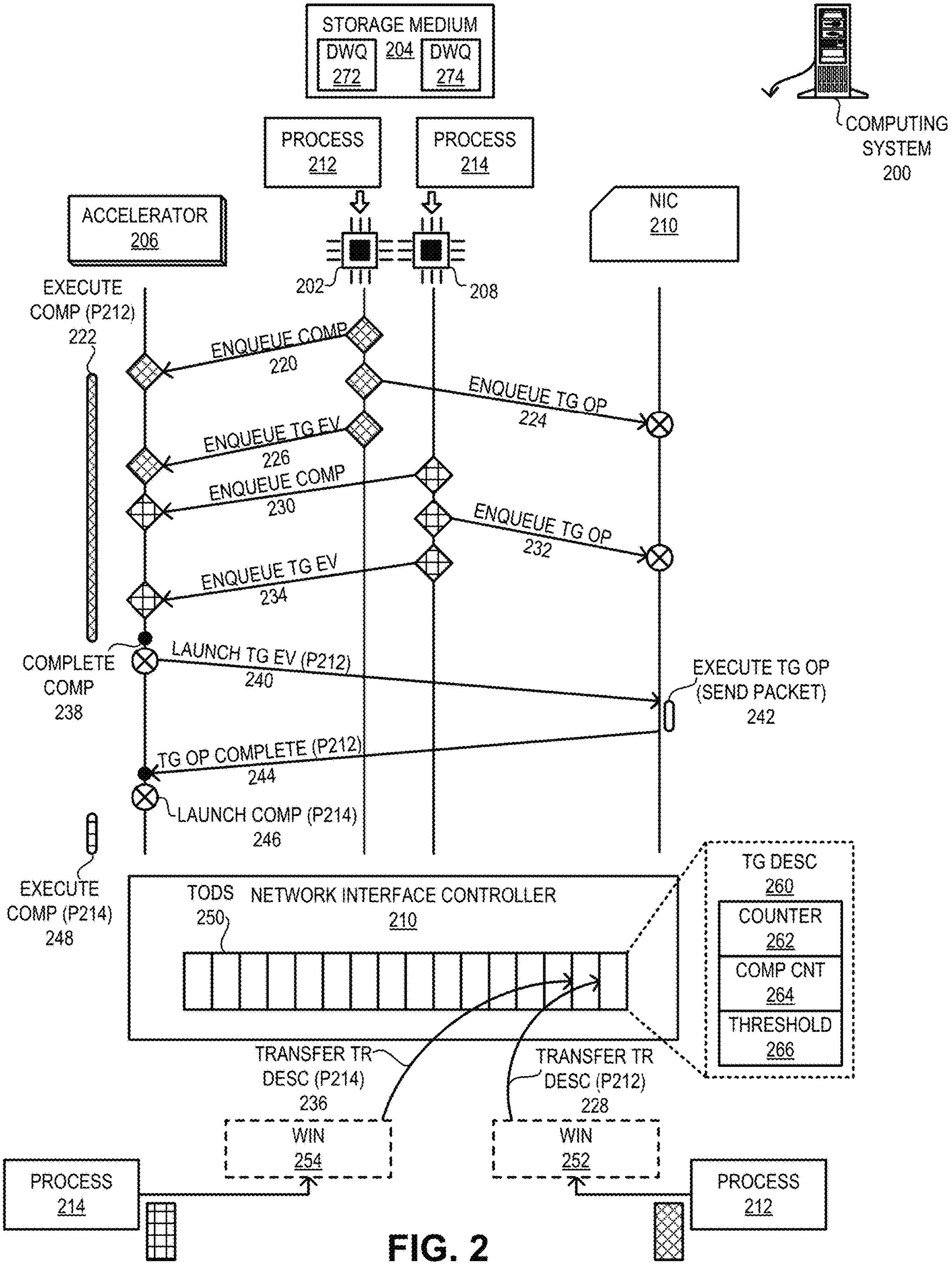
FIG. 2 illustrates an example of inter-component communication facilitating adaptive triggered operation management in a computing system, in accordance with an aspect of the present application.

FIG. 2 illustrates an example of inter-component communication facilitating adaptive triggered operation management in a computing system, in accordance with an aspect of the present application. A computing system 200, which can be an HPC compute node, can include a plurality of processing resources, such as a processor 202 and an accelerator 206 (e.g., a GPU or TPU), a storage medium 204 (e.g., a memory device or a non-volatile persistent storage), and a NIC 210. A number of processes, such as processes 212 and 214, can perform computations on processor 202. The data generated by the computations performed by processes 212 and 214 can be used by corresponding processes on other compute nodes. NIC 210 can then send the data to the other compute node using remote access, such as RDMA. To send the data, process 212 can enqueue a triggered descriptor associated with RDMA in a DWQ 272. Similarly, to send the data, process 214 can enqueue a triggered descriptor associated with RDMA in a DWQ 274. DWQs 272 and 274 can be stored in storage medium 204.

NIC 210 can maintain a TODS 250 in a local storage medium for storing triggered descriptors from DWQs 272 and 274. NIC TODS 250 can be shared among processes 212 and 214 based on window sizes 252 and 254, respectively. NIC 210 can transfer triggered descriptors from DWQs 272 and 274 to TODS 250. Processes 212 and 214 can check window sizes 252 and 254, respectively, to determine the number of available entries for them. Based on window sizes 252 and 254, processes 212 and 214 can enqueue triggered descriptors into DWQs 272 and 274, respectively. NIC 210 can then transfer the triggered descriptors to TODS 250.

Processes 212 and 214 may deploy parallel looped computations performed in a nested and repeating way. Such computations are often performed on different compute nodes and may rely on the output of each other's computations. Processes 212 and 214 can offload the computations from processor 202 to accelerator 206 for execution. During operation, process 212, while executing on processor 202, can enqueue the local computation (e.g., the computation of a distributed operation, such as a summation) to the execution stream of accelerator 206 (operation 220). The execution stream can indicate the sequence of operations to be executed by accelerator 206. Accordingly, accelerator 206 can start executing the computation (operation 222). The computation can include a collective operation, such as a barrier, a bitwise AND operation, a bitwise OR operation, a bitwise XOR operation, a MINIMUM operation, a MAXIMUM operation, a MINIMUM/MAXIMUM with indexes operation, or a SUM operation.

Because the data generated from the computation is to be shared with another compute node at a later time, process 212 can generate a triggered operation that includes a data transfer operation (e.g., sending a packet) based on an RDMA transaction. Process 212 can then enqueue the triggered operation to the execution stream of NIC 210 (operation 224). Enqueueing the triggered operation can include generating a triggered descriptor 260 of the triggered operation and enqueueing it in DWQ 272 if window size 252 has a non-zero value. Triggered descriptor 260 can comprise a trigger counter 262, a completion counter 264, and a trigger threshold value 266. Threshold 266 can be a predetermined value. Trigger counter 262 facilitates a trigger event. The trigger event can increment trigger counter 262. When trigger counter 262 reaches the value of threshold 266, NIC 210 can determine the location of the triggered operation based on triggered descriptor 260 and execute the triggered operation. Because a triggered operation can often repeat (e.g., in a loop), completion counter 264 can indicate the number of times the triggered operation is executed.

Accordingly, process 212 can enqueue the trigger event to the execution stream of accelerator 206 (operation 226). Initially, the value of counters 262 and 264 can be 0, and the value of threshold 266 can be 1. The execution of the trigger event can increment the value of counter 262 to 1, which can then match threshold 266 and initiate the execution of the triggered event. NIC 210 can detect the presence of triggered descriptor 260 in DWQ 272 and transfer triggered descriptor 260 from DWQ 272 to an entry in TODS 250 (operation 228). Here, the triggered operation is deferred until the computation of process 212 is complete.

In addition, process 214 can execute on processor 208 concurrently with process 212. Process 214, while executing on processor 208, can enqueue the local computation to the execution stream of accelerator 206 (operation 230). If accelerator 206 has not completed the computation of process 212, the computation of process 214 can remain enqueued in the execution stream. Process 214 can then enqueue the triggered operation to the execution stream of NIC 210 (operation 232). Enqueueing the triggered operation can include generating a triggered descriptor of the triggered operation and enqueueing it in DWQ 274 if window size 254 has a non-zero value. Process 214 can also enqueue the trigger event to the execution stream of accelerator 206 (operation 234). If NIC 210 detects the presence of the triggered descriptor in DWQ 274, NIC 210 can transfer the triggered descriptor from DWQ 274 to an entry in TODS 250 (operation 236).

When the computation is complete (operation 238), accelerator 230 can execute the subsequent operation in the execution stream, which launches the trigger event of process 212 (operation 240). Accordingly, accelerator 230 can increment the value of counter 262 to 1 (e.g., in triggered descriptor 260). Consequently, NIC 210 can determine that counter 262 has reached threshold 266 and execute the triggered operation (e.g., send a packet comprising the result of the computation) (operation 242). NIC 210 can send the packet from an egress buffer. To reuse the buffer for a subsequent data transmission associated with the next computation, accelerator 206 can wait for the data transmission operation to complete. Accelerator 206 can then determine, from NIC 210, that the triggered operation is complete (operation 244). When the triggered operation is complete, accelerator 230 can execute the subsequent operation in the execution stream and launch the computation associated with process 214 (operation 246). Accordingly, accelerator 206 can start executing the computation of process 214 (operation 248). In this way, TODS 250 can incorporate triggered operations from processes 212 and 214 without using a lock based on window sizes 252 and 254, respectively.

Figure 3A:
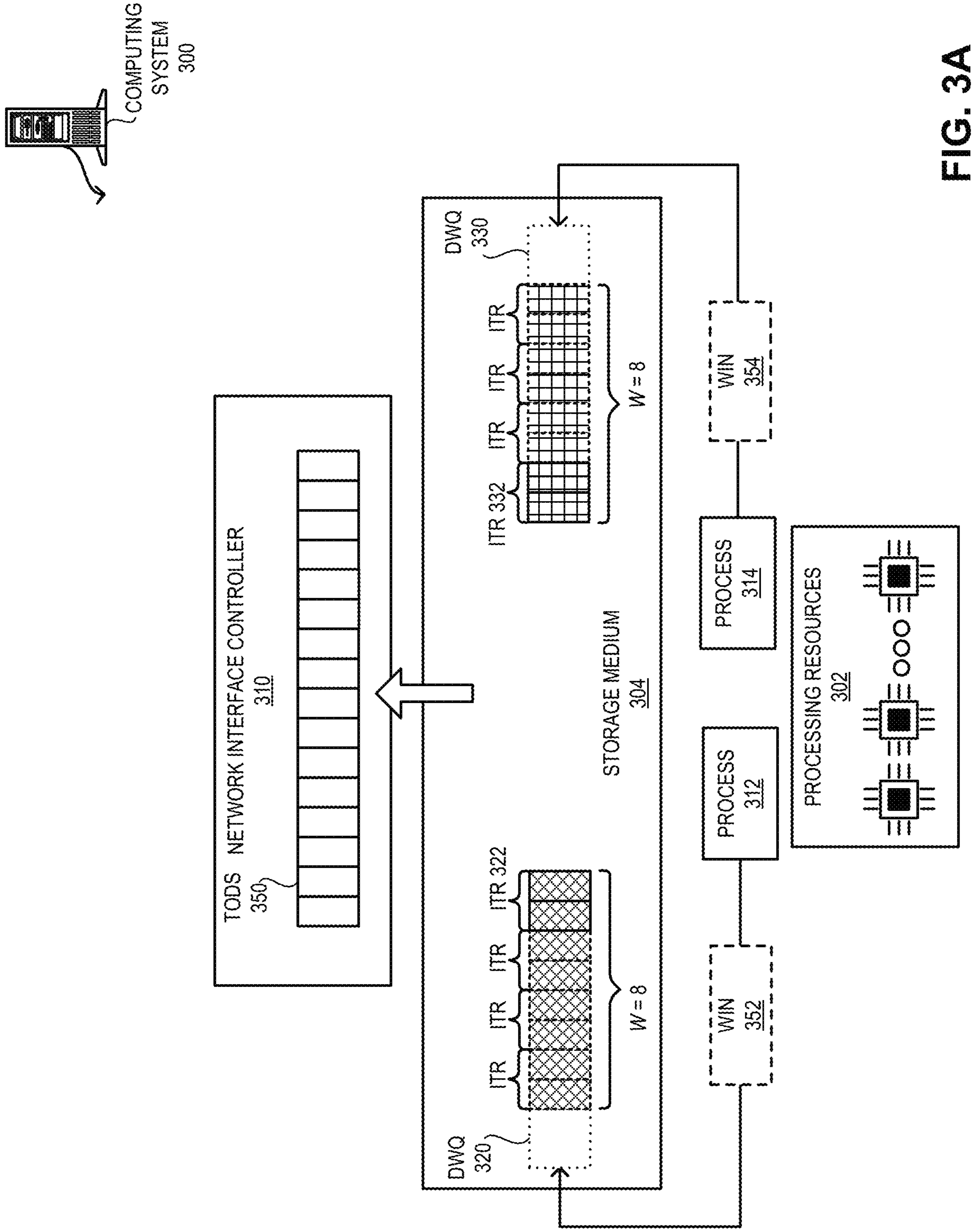
FIG. 3A illustrates an example of partitioning a triggered operation data structure (TODS) in a NIC among a plurality of processes, in accordance with an aspect of the present application.

FIG. 3A illustrates an example of partitioning a TODS in a NIC among a plurality of processes, in accordance with an aspect of the present application. A computing system 300, which can be an HPC compute node, can include a plurality of processing resources 302, such as processors, GPUs, and TPUs, a storage medium 304 (e.g., a memory device or non-volatile persistent storage), and a NIC 310. A number of processes, such as processes 312 and 314, can perform computations on processing resources 302. The data generated by the computations performed by processes 312 and 314 can be used by corresponding processes on other compute nodes. NIC 310 can then send the data to the other compute node using remote access, such as RDMA. To send the data, process 312 can enqueue a triggered descriptor associated with RDMA in a DWQ 320. Similarly, to send the data, process 314 can enqueue a triggered descriptor associated with RDMA in a DWQ 330. DWQs 320 and 330 can be stored in storage medium 304.

NIC 310 can maintain a TODS 350 in a local storage medium for storing triggered descriptors from DWQs 320 and 330. NIC 310 can allocate equal portions of TODS 350 to processes 312 and 314. NIC 310 can transfer triggered descriptors from DWQs 320 and 330 to TODS 350, which can operate as a circular queue. Processes 312 and 314 maintain window sizes 352 and 354, respectively, to indicate the number of available entries. When processes 312 and 314 enqueue triggered descriptors into DWQs 320 and 330, NIC 310 can transfer the triggered descriptors to TODS 350.

If TODS 350 includes 16 entries, window sizes 352 and 354 can each indicate 8 entries. Therefore, the window size, W, associated with processes 312 and 314 can be 8. Before processes 312 and 324 issue any triggered operations, TODS 350 can be idle and capable of accepting 8 triggered descriptors from each of processes 312 and 314. Hence, the maximum window size for processes 312 and 324 can be 8. Window sizes 352 and 354 can be updated and adjusted during the runtime of processes 312 and 314, respectively. However, during the execution of process 312 or 314, the value of window sizes 352 and 354 does not exceed the maximum window size of 8.

Processes 312 and 314 may deploy parallel looped computations performed in a nested and repeating way. For example, processes 312 and 314 can repeatedly perform a summation operation. Suppose that an iteration of the computation includes two triggered operations. Therefore, iteration 322 of process 312 can enqueue two triggered descriptors into DWQ 320. Similarly, an iteration 332 of process 314 can enqueue two triggered descriptors 330. Process 312 may update window size 352 upon completion of iteration 322. In other words, window sizes 352 and 354 can be updated at the iteration boundaries.

Figure 3B:
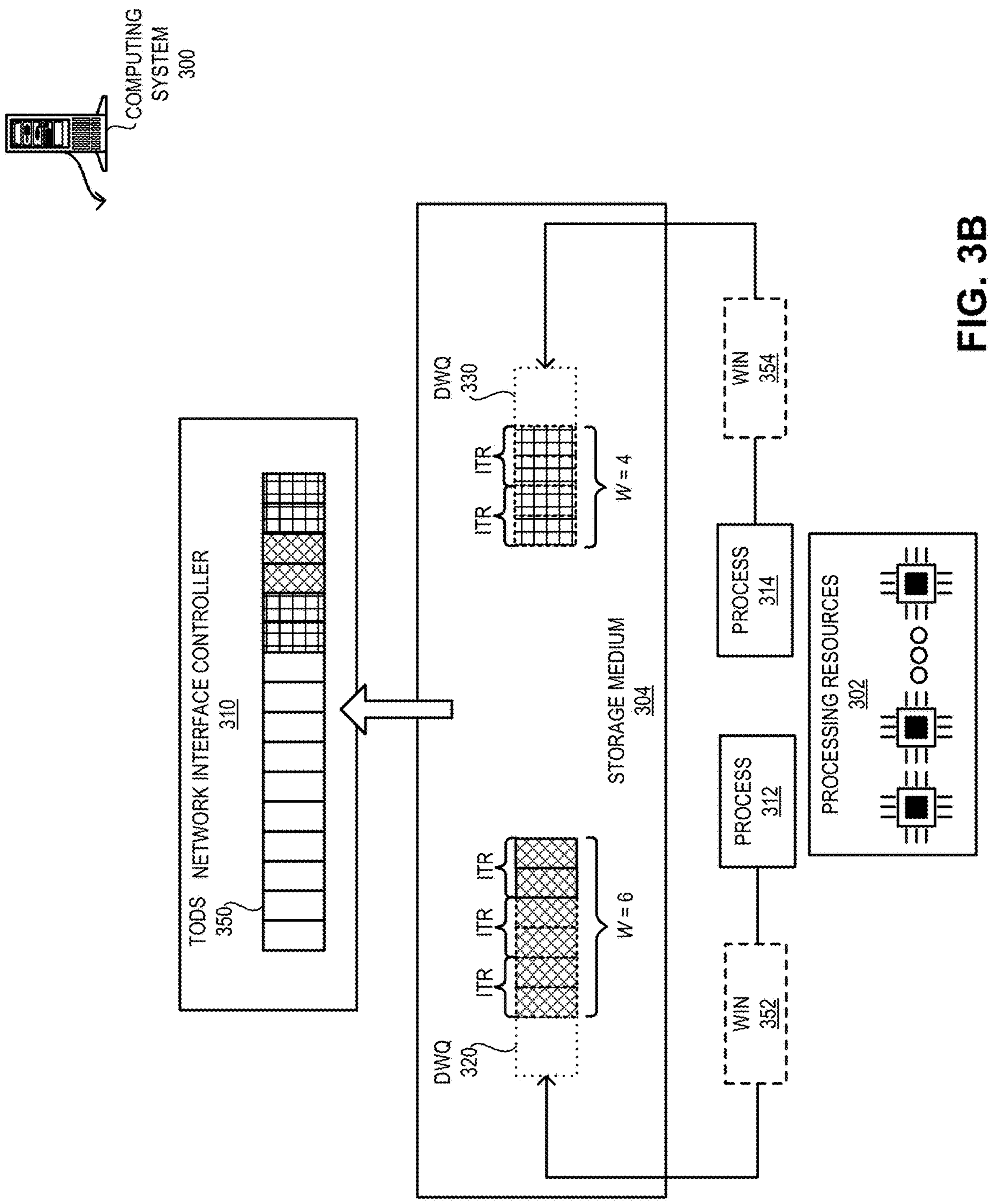
FIG. 3B illustrates an example of decrementing respective window sizes indicating availability in a TODS, in accordance with an aspect of the present application.

FIG. 3B illustrates an example of decrementing respective window sizes indicating availability in a TODS, in accordance with an aspect of the present application. As the execution of processes 312 and 314 can continue, a few triggered descriptors can be enqueued in TODS 350. The size of the adaptive window can be updated by processes 312 and 314. The new window size can be equal to the previous window size minus the number of entries currently used by the process. For example, if two triggered descriptors generated by process 312 are enqueued in DWQ 320, window size 352 can be decremented by two. Similarly, if four triggered descriptors generated by process 314 are enqueued in DWQ 330, window size 354 can be decremented by four. Therefore, the new values of window sizes 352 and 354 can be six and four, respectively.

Figure 3C:
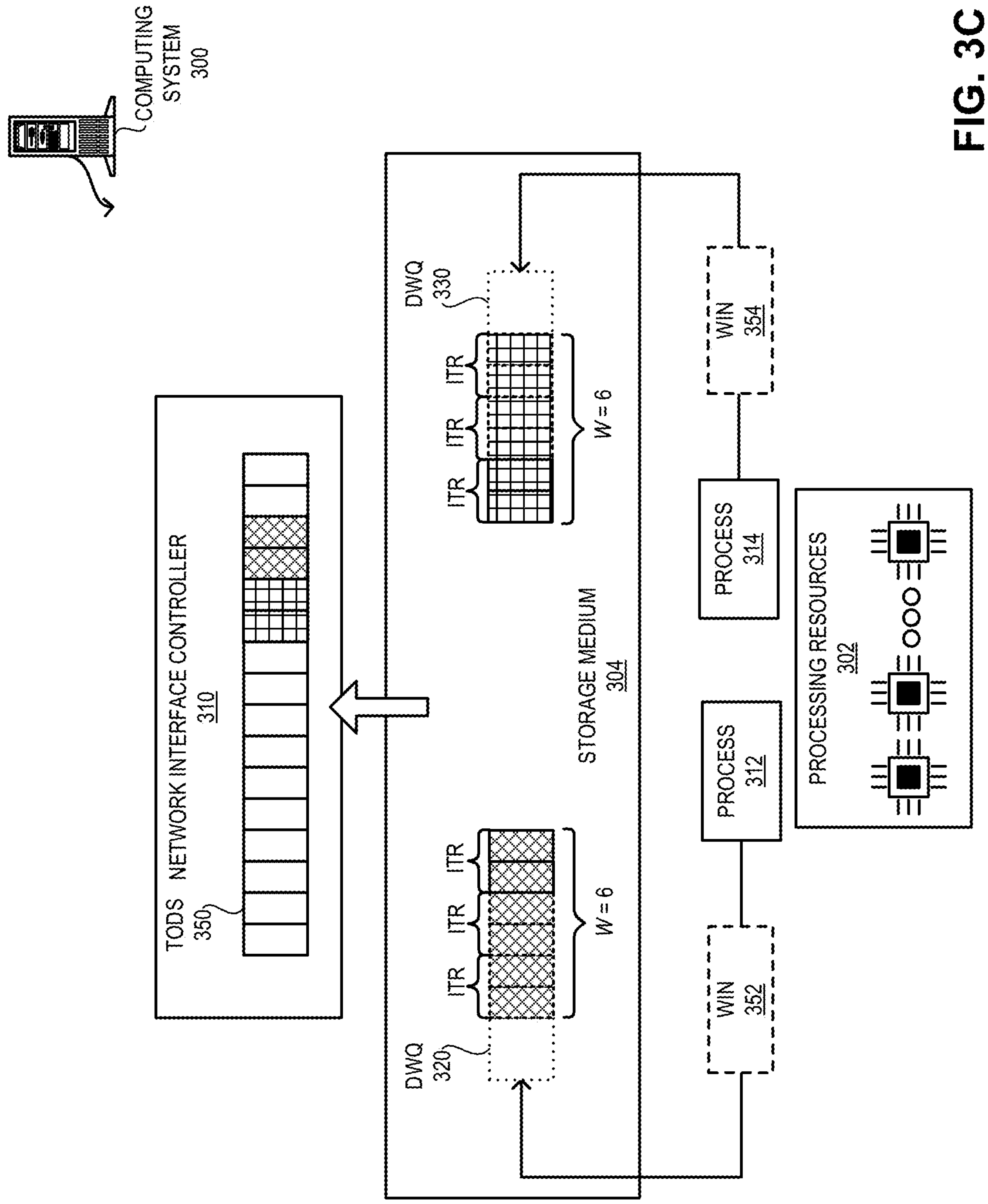
FIG. 3C illustrates an example of incrementing respective window sizes indicating availability in a TODS, in accordance with an aspect of the present application.

FIG. 3C illustrates an example of incrementing respective window sizes indicating availability in a TODS, in accordance with an aspect of the present application. If the respective trigger conditions for two triggered operations of process 314 are satisfied, NIC 310 can execute the triggered operations. The execution of the triggered operations can release the corresponding entries in TODS 350. Accordingly, process 314 can identify the completion of the executed triggered operation and increase its window size 354 by two. If the previous value of the window size is 4, the new window size can be 6. In this way, the window sizes can be adaptive and represent the number of entries currently available for a particular process.

Figure 4A:
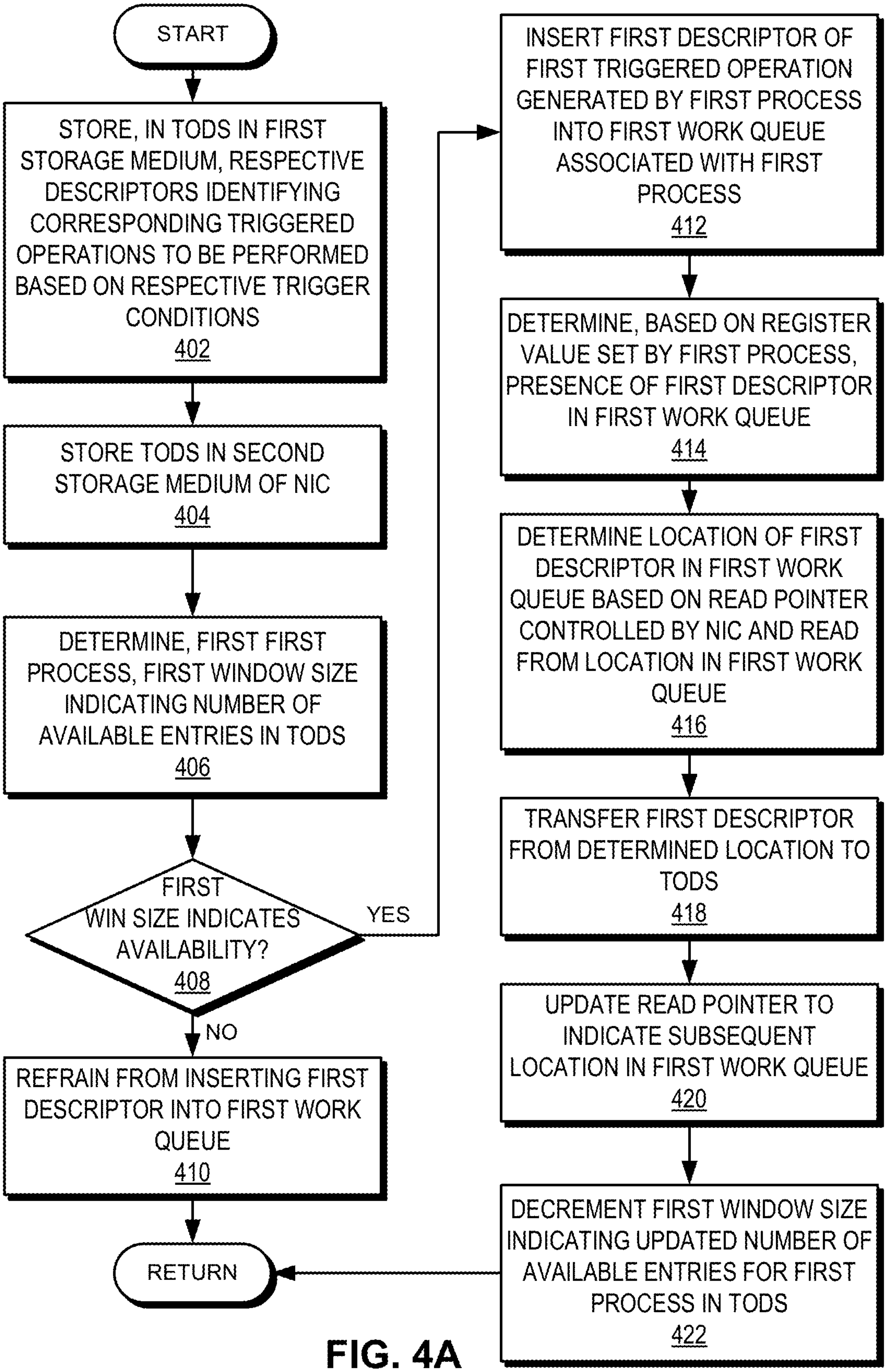
FIG. 4A presents a flowchart illustrating an example of a process of a computing system facilitating adaptive triggered operation management, in accordance with an aspect of the present application.

FIG. 4A presents a flowchart illustrating an example of a process of a computing system facilitating adaptive triggered operation management, in accordance with an aspect of the present application. During operation, the computing system can store, in a first storage medium of the computing system, respective descriptors identifying corresponding triggered operations to be performed based on respective trigger conditions (operation 402). A trigger condition can facilitate a deferred execution of a triggered operation. When the trigger condition is satisfied, the triggered operation can be executed. The computing system can also store a TODS in a second storage medium of the NIC (operation 404). Here, the TODS can include a plurality of entries, each of which can store a triggered descriptor. The descriptor can include identifying information, such as source buffer and target information, of the triggered information.

To facilitate lockless sharing of the TODS among the processes generating the triggered operations, the computing system can determine, for a first process, a first window size indicating the number of available entries in the TODS (operation 406). The window size can be determined by distributing the entries in the TODS among the processes generating the triggered operations. For example, if there are sixteen entries and two processes, eight entries can be allocated to each process. As a result, a respective process becomes associated with a predetermined number of entries in the TODS. If a first process and a second process generate triggered operations, the computing system can allocate a first window size and a second window size to the first and second processes, respectively.

The computing system can determine whether the first window size indicates availability in the TODS (operation 408). The availability indicates that the number of entries of TODS allocated to the first process can accommodate another descriptor. Therefore, a non-zero value of the first window size can indicate the availability of an entry. If the window size indicates availability, the computing system can insert a first descriptor of a first triggered operation generated by the first process into a first work queue, such as a DWQ (operation 412). The work queues can be in the storage medium (e.g., a memory) of the computing system. The value can indicate that a new descriptor has been enqueued. The computing system, at the NIC, can then determine, based on the register value set by the first process, the presence of the first descriptor in the first work queue (operation 414).

The computing system, at the NIC, can determine the location of the first descriptor in the first work queue based on a read pointer. The NIC can control the read pointer of the first work queue and indicate the location of the next descriptor in the DWQ. The read pointer can indicate the next descriptor to be read from the work queue. Hence, the NIC can determine the location based on the read pointer. The computing system can then read from the location in the work queue (operation 416). Because the window size has indicated the availability of an entry in the TODS, the computing system can then transfer the first descriptor from the determined location to the TODS (operation 418). Transferring the first descriptor can include reading the first descriptor from the location and storing it in the next available entry in the TODS.

The NIC can then update the read pointer to indicate the subsequent location in the first work queue (operation 420). When the first descriptor is transferred to the first segment, the entry storing the first descriptor becomes unavailable. As a result, the number of available entries in the first segment can be decreased accordingly. Because the first window size indicates the number of available entries for the first process, the computing system can decrement the first window size indicating the updated number of available entries for the first process in the TODS (operation 422). If the first window size indicates the unavailability of an entry (e.g., a window size of zero), the computing system can determine that the first segment may not accommodate another descriptor. Accordingly, the computing system can refrain from inserting the first descriptor into the first work queue (operation 410).

Figure 4B:
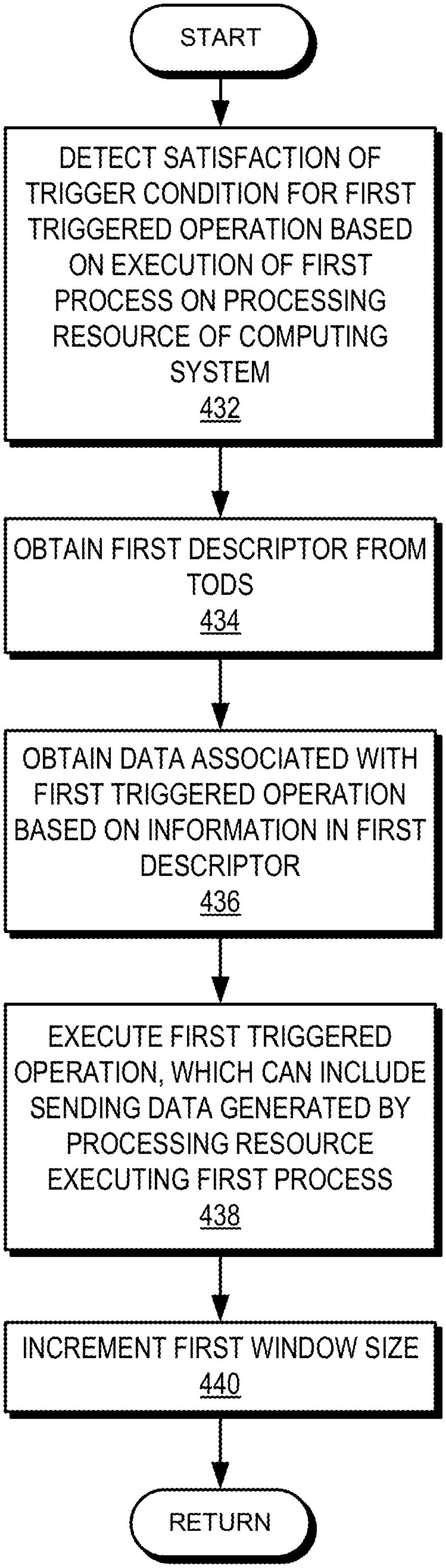
FIG. 4B presents a flowchart illustrating an example of a process of a NIC performing a triggered operation from a process based on a triggered descriptor in a local TODS, in accordance with an aspect of the present application.

FIG. 4B presents a flowchart illustrating an example of a process of a NIC performing a triggered operation from a process based on a triggered descriptor in a local TODS, in accordance with an aspect of the present application. During operation, the NIC can detect the satisfaction of a trigger condition for the first triggered operation based on the execution of the first process on a processing resource of the computing system (operation 432). As described in conjunction with FIG. 2, the first process can offload the computation to a processing resource, such as an accelerator, that can generate the data to be transferred by the triggered operation. Here, the computation can be a part of the execution of the first process. When the execution of the computation is complete, the trigger condition can be satisfied. When the trigger condition is satisfied, the NIC can launch the triggered operation.

To launch the triggered operation, the NIC can obtain the first descriptor from the TODS (operation 434). The first descriptor can include identifying information associated with the first triggered operation, such as the location of the source buffer storing the data to be transferred by the triggered operation. The data can be generated by the computation executed by the processing resource and stored in the source buffer (e.g., in the storage medium of the computing system). Accordingly, the NIC can obtain data associated with the first triggered operation based on the information in the first descriptor (operation 436). The NIC can then execute the triggered operation, which can include sending the data generated by the processing resource (e.g., a processor or an accelerator) executing the first process (operation 438). For example, the NIC can send the data via a packet to another process. The retrieval of the descriptor and subsequent execution of the triggered operation can free the entry storing the descriptor. Therefore, to reflect the availability of the entry, the NIC can increment the window size (operation 440).

Figure 5:
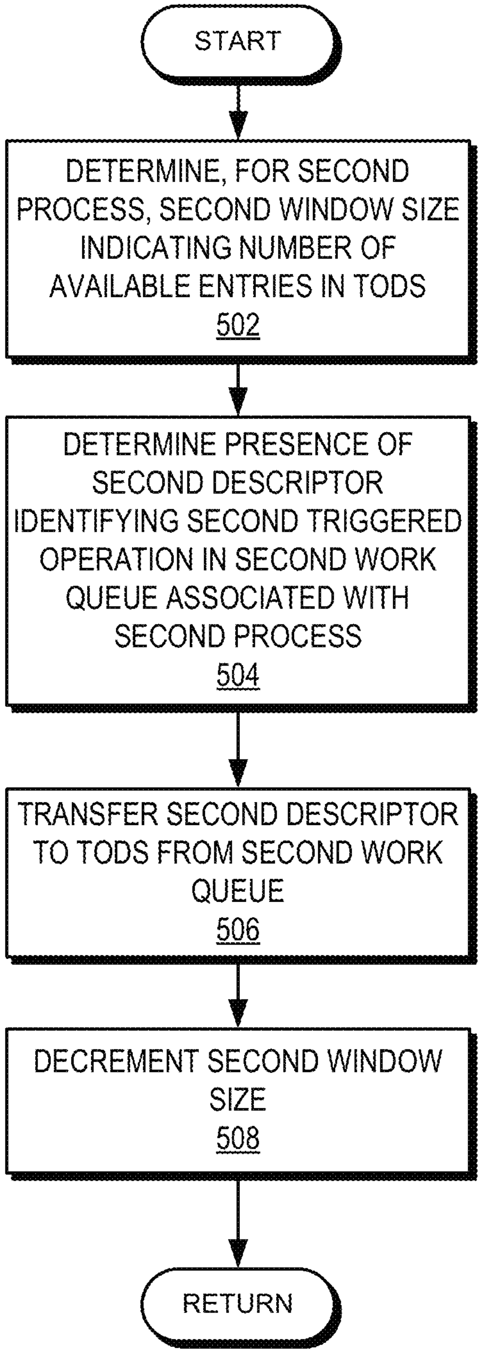
FIG. 5 presents a flowchart illustrating an example of a process of a NIC performing a triggered operation from another process based on a triggered descriptor in the local TODS, in accordance with an aspect of the present application.

FIG. 5 presents a flowchart illustrating an example of a process of a NIC performing a triggered operation from another process based on a triggered descriptor in the local TODS, in accordance with an aspect of the present application. Typically, a set of processes, which can include a first process and a second process, can generate triggered operations and contend for the entries in TODS. The NIC can allocate a number of entries to a respective process of the set of processes. During operation, the NIC can determine, for the second process in the set of processes, a second window size indicating the number of available entries in the TODS (operation 502). The window size can be determined by distributing the entries in the TODS among the processes generating the triggered operations. For example, if there are sixteen entries and two processes, eight entries can be allocated to each process. As a result, a respective process becomes associated with a predetermined number of entries in the TODS.

Each work queue can be associated with a register for notifying the NIC. Hence, the NIC can determine the presence of the second descriptor based on the value of the register associated with the second work queue. Therefore, when the second process places a descriptor in the second work queue, the second process can set a predetermined value in the register. The NIC can then determine the presence of a second descriptor identifying a second triggered operation in a second work queue associated with the second process (operation 504). Since the second window size indicates availability, the NIC can transfer the second descriptor to the TODS from the second work queue (operation 506). Because of the transfer, the entry storing the second descriptor can become unavailable. To reflect the unavailability, the NIC can decrement the second window size, which can then indicate the current number of available entries (i.e., the reduced number of entries) for the second process in the TODS (operation 508).

Figure 6:
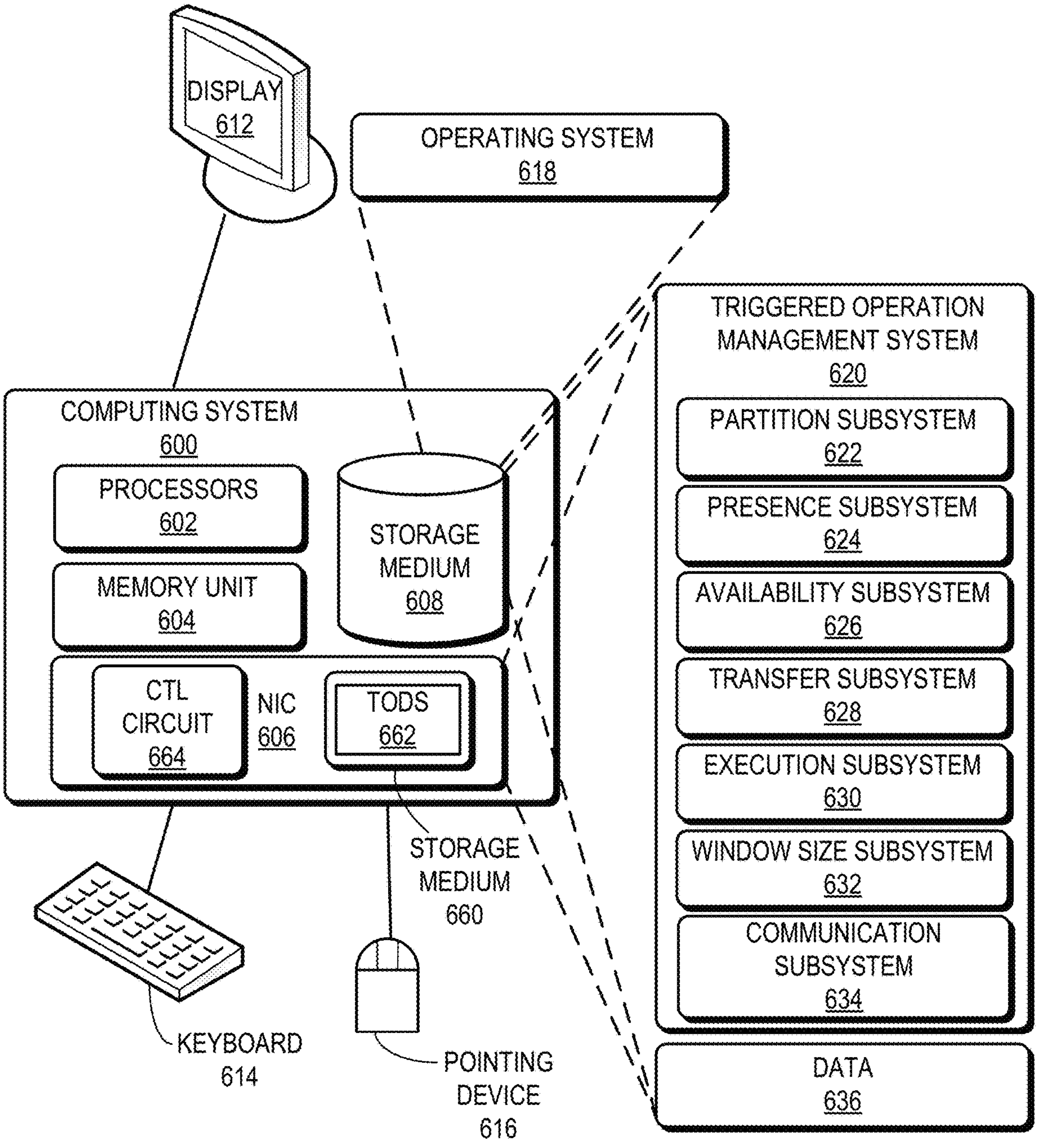
FIG. 6 illustrates an example of a computing system with a NIC facilitating adaptive triggered operation management, in accordance with an aspect of the present application.

FIG. 6 illustrates an example of a computing system with a NIC facilitating adaptive triggered operation management, in accordance with an aspect of the present application. A computing system 600 can include a set of processors 602, a memory unit 604, a NIC 606, and a storage medium 608. Memory unit 604 can include a set of volatile memory devices (e.g., dual in-line memory module (DIMM)). Furthermore, computing system 600 may be coupled to a display device 612, a keyboard 614, and a pointing device 616, if needed. Storage medium 608 can store an operating system 618. A triggered operation management system 620 and data 636 associated with triggered operation management system 620 can be maintained and executed from storage medium 608 and/or NIC 606. NIC 606 can also include a storage medium 660, which can store a TODS 662 for storing triggered descriptors.

Triggered operation management system 620 can include instructions, which when executed by computing system 600, can cause computing system 600 (or NIC 606) to perform methods and/or processes described in this disclosure. Triggered operation management system 620 can include instructions for allocating the entries of the TODS to the processes generating triggered operations (partition subsystem 622), as described in conjunction with operation 406 in FIG. 4A. Triggered operation management system 620 can also include instructions for determining the presence of a triggered descriptor of a triggered operation in a work queue (e.g., in memory unit 604) (presence subsystem 624), as described in conjunction with operation 414 in FIG. 4A. Triggered operation management system 620 can include instructions for determining the availability of an entry for the triggered descriptor based on the window size associated with the process (availability subsystem 626), as described in conjunction with operation 408 in FIG. 4A.

Triggered operation management system 620 can also include instructions for transferring the triggered descriptor to the TODS if an entry is available (transfer subsystem 628), as described in conjunction with operations 416 and 418 in FIG. 4A. Triggered operation management system 620 can then include instructions for determining that a trigger condition for the triggered operation is satisfied (execution subsystem 630), as described in conjunction with operation 432 in FIG. 4B. In addition, triggered operation management system 620 can include instructions for executing the triggered operation if the trigger condition is satisfied (execution subsystem 630), as described in conjunction with operation 438 in FIG. 4B.

Moreover, triggered operation management system 620 can include instructions for adjusting the window size based on the transfer of the triggered descriptor to the TODS and the execution of the triggered operation (window size subsystem 632, as described in conjunction with operation 422 in FIG. 4A and operation 440 in FIG. 4B. Triggered operation management system 620 may further include instructions for sending and receiving data associated with the computations performed by the processes (communication subsystem 634), as described in conjunction with operation 438 in FIG. 4B. Triggered operation management system 620 can also be operated by control circuit 664 of NIC 606. Data 636 can include any data that can facilitate the operations of triggered operation management system 620. Data 636 can include, but is not limited to, data generated by the computations performed by the processes running on processors 602.

Figure 7:
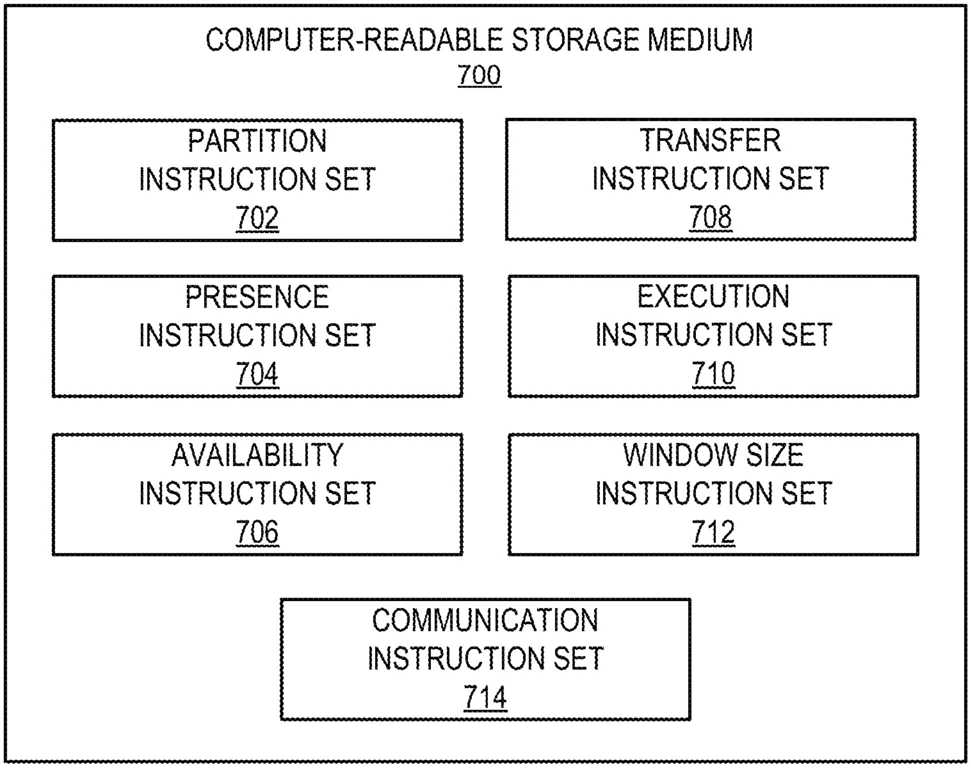
FIG. 7 illustrates an example of a computer-readable storage medium that facilitates adaptive triggered operation management, in accordance with an aspect of the present application.

FIG. 7 illustrates an example of a computer-readable storage medium that facilitates adaptive triggered operation management, in accordance with an aspect of the present application. Computer-readable storage medium 700 can comprise one or more integrated circuits, and may store fewer or more instruction sets than those shown in FIG. 7. Further, storage medium 700 may be integrated with a computer system, or integrated in a device that is capable of communicating with other computer systems and/or devices. For example, storage medium 700 can be in the NIC of a computer system.

Storage medium 700 can comprise instruction sets 702-714, which when executed, can perform functions or operations similar to subsystems 622-634, respectively, of triggered operation management system 620 of FIG. 6. Here, storage medium 700 can include a partition instruction set 702; a presence instruction set 704, an availability instruction set 706; a transfer instruction set 708; an execution instruction set 710; a window size instruction set 712; and a communication instruction set 714.

The description herein is presented to enable any person skilled in the art to make and use the invention, and is provided in the context of a particular application and its requirements. Various modifications to the disclosed examples will be readily apparent to those skilled in the art, and the general principles defined herein may be applied to other examples and applications without departing from the spirit and scope of the present invention. Thus, the present invention is not limited to the examples shown, but is to be accorded the widest scope consistent with the claims.

One aspect of the present technology can provide a system for managing triggered operations in a computing system. The computing system can include a first storage medium to store descriptors identifying triggered operations to be performed based on respective trigger conditions. The NIC of the computing system can include a second storage medium storing a data structure. During operation, the system can determine, for a first process, a first window size indicating a number of available entries in the data structure. If the first window size indicates an available entry in the data structure, the system can insert a first descriptor of a first triggered operation generated by the first process into a first work queue associated with the first process. The system, at the NIC, can determine a location of the first descriptor in the first work queue. The system can then transfer the first descriptor from the determined location to the data structure. Subsequently, the system can decrement the first window size indicating an updated number of available entries for the first process in the data structure. These operations of the system are described in conjunction with FIG. 4A.

In a variation on this aspect, the system, at the NIC, can detect the satisfaction of a trigger condition for the first triggered operation and obtain the first descriptor from the data structure. The system can then execute the first triggered operation based on information in the first descriptor and increment the first window size. These operations of the system are described in conjunction with FIG. 4B.

In a further variation, the first triggered operation can be generated based on the execution of the first process on a processor of the computing system. The computing system can also include an accelerator that can execute a trigger event satisfying the trigger condition and causing the NIC to execute the first triggered operation. These features of the system are described in conjunction with FIG. 2.

In a further variation, executing the first triggered operation can include sending a packet comprising payload data generated by the first process. This operation of the system is described in conjunction with FIG. 2.

In a further variation, the trigger condition can be satisfied in response to the execution of a segment of the first process generating the payload data is complete. This operation of the system is described in conjunction with FIG. 2.

In a variation on this aspect, the system can decrement the first window size in response to an iteration of the first process being completed. Here, the number of decrements of the first window size can indicate a number of triggered operations in the iteration. These features of the system are described in conjunction with FIGS. 3A, 3B, and 3C.

In a variation on this aspect, the system can determine, for a second process, a second window size indicating a number of available entries in the data structure. The system can transfer, from a second work queue associated with a second process, a second descriptor of a second triggered operation to the data structure. The NIC can then decrement a second window size indicating an updated number of available entries for the second process in the data structure. These operations of the system are described in conjunction with FIG. 5.

In a variation on this aspect, the system can determine the unavailability of an entry in the data structure based on the first window size. The system can then refrain from inserting a descriptor into the first work queue. These operations of the system are described in conjunction with FIG. 4A.

In a variation on this aspect, the system, at the NIC, can determine the presence of the first descriptor in the first work queue based on a register value set by the first process. The system can then read from the location in the first work queue based on a pointer controlled by the NIC. Subsequently, the NIC can update the pointer to indicate a subsequent location in the first work queue. These operations of the system are described in conjunction with FIG. 4A.

In this disclosure, the term "switch" is used in a generic sense, and it can refer to any standalone network device or fabric device operating in any network layer. "Switch" should not be interpreted as limiting examples of the present invention to layer-2 networks. Any device that can forward traffic to an external device or another switch can be referred to as a "switch." The switch can also be virtualized.

Furthermore, if a network device facilitates communication between networks, the network device can be referred to as a gateway device. Any physical or virtual device (e.g., a virtual machine or switch operating on a computing device) that can forward traffic to an end device can be referred to as a "network device." Examples of a "network device" include, but are not limited to, a layer-2 switch, a layer-3 router, a routing switch, or a fabric switch comprising a plurality of similar or heterogeneous smaller physical and/or virtual switches.

The term "packet" refers to a group of bits that can be transported together across a network. "Packet" should not be interpreted as limiting examples of the present invention to a particular layer of a network protocol stack. "Packet" can be replaced by other terminologies referring to a group of bits, such as "message," "frame," "cell," "datagram," or "transaction." Furthermore, the term "port" can refer to the port that can receive or transmit data. "Port" can also refer to the hardware, software, and/or firmware logic that can facilitate the operations of that port.

The data structures and code described in this detailed description are typically stored on a computer-readable storage medium, which may be any device or medium that can store code and/or data for use by a computer system. The computer-readable storage medium can include, but is not limited to, volatile memory, non-volatile memory, magnetic and optical storage devices such as disks, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and codes and stored within the computer-readable storage medium.

The methods and processes described herein can be executed by and/or included in hardware logic blocks or apparatus. These logic blocks or apparatus may include, but are not limited to, an application-specific integrated circuit (ASIC) chip, a field-programmable gate array (FPGA), a dedicated or shared processor that executes a particular software logic block, a piece of code at a particular time, and/or other programmable-logic devices now known or later developed. When the hardware logic blocks or apparatus are activated, they perform the methods and processes included within them.

The foregoing descriptions of examples of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A method executable on a computing system, comprising:

maintaining, in a first storage medium of the computing system, a plurality of work queues corresponding to a plurality of processes, the work queues storing descriptors identifying corresponding triggered operations to be performed based on respective trigger conditions;

maintaining, by a network interface controller (NIC) of the computing system, a data structure in a second storage medium, entries in the data structure being allocated by the NIC to the plurality of processes;

determining a first window size indicating a number of available entries in the data structure which are allocated to a first process;

in response to the first window size indicating that at least one available entry in the data structure is allocated to the first process, inserting a first descriptor of a first triggered operation generated by the first process into a first work queue corresponding to the first process;

in response to detecting the first descriptor in the first work queue, offloading the first triggered operation to the NIC by transferring the first descriptor from the first work queue to the data structure; and decrementing the first window size.

2. The method of claim 1, further comprising:

detecting satisfaction of a trigger condition for the first triggered operation;

obtaining the first descriptor from the data structure;

executing the first triggered operation based on information in the first descriptor; and incrementing the first window size.

3. The method of claim 2, further comprising:

generating, by a processor of the computing system, the first triggered operation based on execution of the first process; and executing, by an accelerator of the computing system, a trigger event satisfying the trigger condition and causing the NIC to execute the first triggered operation.

4. The method of claim 3, wherein executing the first triggered operation further comprises sending a packet comprising payload data generated by the first process.

5. The method of claim 4, wherein the trigger condition is satisfied in response to execution of a segment of the first process generating the payload data being complete.

6. The method of claim 1, further comprising decrementing the first window size in response to an iteration of the first process being completed, and wherein a number of decrements of the first window size indicate a number of triggered operations in the iteration.

7. The method of claim 1, further comprising: determining a second window size indicating a number of available entries in the data structure which are allocated to a second process;

in response to detecting a second descriptor associated with a second triggered operation in a second work queue, offloading the second triggered operation to the NIC by transferring the second descriptor to the data structure; and decrementing the second window size indicating an updated number of available entries in the data structure allocated to the second process.

8. The method of claim 1, further comprising:

determining, based on the first window size, unavailability of an entry allocated to the first process in the data structure; and refraining from inserting a triggered descriptor into the first work queue.

9. The method of claim 1, further comprising:

determining presence of the first descriptor in the first work queue based on a register value set by the first process;

reading from the first work queue based on a pointer controlled by the NIC; and updating the pointer to indicate a subsequent location in the first work queue.

10. A computing system, comprising:

a processor;

a first storage medium storing a plurality of work queues corresponding to a plurality of processes, the work queues storing descriptors identifying triggered operations to be performed based on respective trigger conditions;

a network interface controller (NIC) comprising a second storage medium storing a data structure, entries in the data structure being allocated by the NIC to a plurality of processes;

a non-transitory computer-readable storage medium storing instructions that when executed by the processor cause the computing system to:

determine a first window size indicating a number of available entries in the data structure which are allocated to a first process;

in response to the first window size indicating that at least one available entry in the data structure is allocated to the first process, insert a first descriptor of a first triggered operation generated by the first process into a first work queue corresponding to the first process;

in response to detecting the first descriptor in the first work queue, determine a location of the first descriptor in the first work queue;

offload the first triggered operation to the NIC by transferring the first descriptor from the determined location to the data structure; and decrement the first window size.

11. The computing system of claim 10, wherein the instructions further cause the computing system to:

detect satisfaction of a trigger condition for the first triggered operation;

obtain the first descriptor from the data structure;

execute the first triggered operation based on information in the first descriptor; and increment the first window size.

12. The computing system of claim 11, wherein the first triggered operation is generated based on execution of the first process on the processor of the computing system; and wherein the computing system further comprises an accelerator to execute a trigger event satisfying the trigger condition and causing the network interface controller to execute the first triggered operation.

13. The computing system of claim 12, wherein executing the first triggered operation further comprises sending a packet comprising payload data generated by the first process.

14. The computing system of claim 13, wherein the trigger condition is satisfied in response to execution of a segment of the first process generating the payload data being complete.

15. The computing system of claim 10, wherein the first process is to decrement the first window size in response to an iteration of the first process being completed, and wherein a number of decrements of the first window size indicate a number of triggered operations in the iteration.

16. The computing system of claim 10, wherein the instructions further cause the computing system to:
determine a second window size indicating a number of available entries in the data structure which are allocated to a second process;
in response to detecting a second descriptor associated with a second triggered operation in a second work queue, offload the second triggered operation to the NIC by transferring the second descriptor to the data structure; and
decrement the second window size indicating an updated number of available entries in the data structure for the second process.

17. The computing system of claim 10, wherein the first process is further to:
determine, based on the first window size, unavailability of an entry allocated to the first process in the data structure; and
refrain from inserting a triggered descriptor into the first work queue.

18. The computing system of claim 10, wherein the NIC is further to:
determine presence of the first descriptor in the first work queue based on a register value set by the first process;
read from the location in the first work queue based on a pointer controlled by the network interface controller; and
update the pointer to indicate a subsequent location in the first work queue.

19. A non-transitory computer-readable storage medium comprising instructions which, when executed by a processor of a computing system cause the computing system to:
store, in a storage medium of the computing system, a plurality of work queues corresponding to a plurality of processes, the work queues storing descriptors identifying corresponding triggered operations to be performed based on respective trigger conditions;
maintain, by a network interface controller (NIC), a data structure in a second storage medium, entries in the data structure being allocated by the NIC to a plurality of processes;
determine a first window size indicating a number of available entries in the data structure which are allocated to a first process;
in response to the first window size indicating that at least one available entry in the data structure is allocated to the first process, insert a first descriptor of a first triggered operation generated by the first process into a first work queue corresponding to the first process;
determine a location of the first descriptor in the first work queue based on a register value set by the first process;
in response to detecting the first descriptor in the first work queue, offload the first triggered operation to the NIC by transferring the first descriptor from the determined location to the data structure; and
decrement the first window size.

20. The non-transitory computer-readable storage medium of claim 19, wherein the instructions which, when executed by the processor, cause the computing system to:
detect satisfaction of a trigger condition for the first triggered operation;
obtain the first descriptor from the data structure;
execute the first triggered operation based on information in the first descriptor; and
increment the first window size.

* * * * *